United States Patent
Sugarev

(10) Patent No.: US 12,113,903 B2
(45) Date of Patent: *Oct. 8, 2024

(54) LONG-LASTING REFRESH TOKENS IN SELF-CONTAINED FORMAT

(71) Applicant: SAP SE, Walldorf (DE)

(72) Inventor: Radoslav Ivanov Sugarev, Petrich (BG)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,935

(22) Filed: Dec. 30, 2022

(65) Prior Publication Data

US 2023/0138368 A1 May 4, 2023

Related U.S. Application Data

(63) Continuation of application No. 17/158,533, filed on Jan. 26, 2021, now Pat. No. 11,546,159.

(51) Int. Cl.
*H04L 9/32* (2006.01)
*H04L 9/08* (2006.01)

(52) U.S. Cl.
CPC .......... *H04L 9/3213* (2013.01); *H04L 9/0819* (2013.01); *H04L 9/3242* (2013.01); *H04L 9/3247* (2013.01)

(58) Field of Classification Search
CPC ... H04L 9/3213; H04L 9/3247; H04L 9/0891; H04L 9/3242; H04L 9/0819
See application file for complete search history.

(56) References Cited

U.S. PATENT DOCUMENTS 6,959,393 B2  10/2005  Hollis et al.
7,778,931 B2   8/2010  Rits
(Continued)

FOREIGN PATENT DOCUMENTS

CN  104255007  12/2014
CN  108322472   7/2018
(Continued)

OTHER PUBLICATIONS

Office Action in Chinese Appln. No. 202111281843.X, dated Jun. 3, 2023, 18 pages (with English translation).
(Continued)

*Primary Examiner* — Mohammad A Siddiqi
(74) *Attorney, Agent, or Firm* — Fish & Richardson P.C.

(57) ABSTRACT

The present disclosure relates to computer-implemented methods, software, and systems for securely generating a new access token based on relatively long-lasting refresh tokens in self-contained format. A first request to generate a new access token for authorization of a client application with an application server is received and includes a first protected version of a refresh token. The first protected version of the refresh token is an encrypted version of the refresh token based on a first client identifier. The first protected version of the refresh token is decrypted to determine content of the refresh token based on a second client identifier of the client application that is externally invoked for validating the authorization. In response to successfully decrypting the first protected version, performing a validation of the refresh token. In response to successfully validating the refresh token, generating the new access token and providing it to the client application.

20 Claims, 5 Drawing Sheets

(56) References Cited

U.S. PATENT DOCUMENTS

| | | | |
|---|---|---|---|
| 8,019,860 B2 | 9/2011 | Ivanov et al. | |
| 8,650,622 B2* | 2/2014 | Murakami | H04W 12/0431 |
| | | | 705/26.1 |
| 8,700,899 B1 | 4/2014 | Juels | |
| 9,197,408 B2 | 11/2015 | Amato | |
| 9,256,413 B2 | 2/2016 | Ivanov et al. | |
| 9,344,410 B1 | 5/2016 | Lin | |
| 9,819,672 B1* | 11/2017 | Machani | H04L 63/0853 |
| 9,900,212 B2 | 2/2018 | Pavlov et al. | |
| 10,469,484 B1 | 11/2019 | Chen et al. | |
| 10,887,301 B1 | 1/2021 | Vera et al. | |
| 11,349,662 B2 | 5/2022 | Chang et al. | |
| 11,546,159 B2* | 1/2023 | Sugarev | H04L 9/0819 |
| 11,563,580 B2 | 1/2023 | Sugarev | |
| 2009/0258631 A1* | 10/2009 | Forsberg | H04L 63/08 |
| | | | 455/411 |
| 2013/0007846 A1 | 1/2013 | Murakami et al. | |
| 2015/0163061 A1* | 6/2015 | Gupta | H04L 63/08 |
| | | | 713/155 |
| 2015/0348015 A1 | 12/2015 | Ren et al. | |
| 2016/0179494 A1 | 6/2016 | Pavlov et al. | |
| 2017/0085563 A1* | 3/2017 | Royyuru | G06Q 20/12 |
| 2018/0034796 A1 | 2/2018 | Ross et al. | |
| 2018/0167367 A1 | 6/2018 | John et al. | |
| 2019/0251241 A1 | 8/2019 | Bykampadi et al. | |
| 2019/0306138 A1 | 10/2019 | Carru et al. | |
| 2019/0372958 A1* | 12/2019 | Dunjic | H04L 9/3213 |
| 2019/0394042 A1 | 12/2019 | Peddada | |
| 2020/0014681 A1 | 1/2020 | Sajja et al. | |
| 2020/0059466 A1 | 2/2020 | Jiang et al. | |
| 2020/0067711 A1 | 2/2020 | Abadir et al. | |
| 2020/0211002 A1 | 7/2020 | Steinberg et al. | |
| 2021/0288808 A1* | 9/2021 | Bahety | H04L 9/3247 |
| 2021/0336791 A1 | 10/2021 | Choi et al. | |
| 2022/0094547 A1 | 3/2022 | Duchastel et al. | |
| 2022/0138306 A1 | 5/2022 | Theodor et al. | |
| 2022/0232003 A1 | 7/2022 | Smolny et al. | |
| 2022/0239483 A1 | 7/2022 | Sugarev | |
| 2022/0239491 A1 | 7/2022 | Sugarev | |
| 2022/0377064 A1* | 11/2022 | Raj | H04L 9/3213 |
| 2022/0383417 A1 | 12/2022 | Cummings | |
| 2023/0146453 A1* | 5/2023 | Wang | H04W 12/06 |
| | | | 713/168 |

FOREIGN PATENT DOCUMENTS

| | | |
|---|---|---|
| CN | 108463982 | 8/2018 |
| CN | 111131301 | 5/2020 |
| EP | 3422630 | 1/2019 |

OTHER PUBLICATIONS

U.S. Appl. No. 17/096,605, Sugarev, filed Nov. 12, 2020.

Extended European Search Report issued in European Application No. 21205149.4 on Apr. 7, 2022, 7 pages.

Faynberg et al., "On dynamic access control in Web 2.0 and beyond: Trends and technologies." Bell Labs Technical Journal 16.2, Sep. 2011, 199-218, 20 pages.

Hardt, "The OAuth 2.0 Authorization Framework", Oct. 2012, [retrieved on Jan. 27, 2021], retrieved from: URL <https://www.rfc-editor.org/info/rfc6749>, 76 pages.

Jones et al., "JSON Web Signature (JWS)", May 2015, [retrieved on Jan. 27, 2021], retrieved from: URL <https://www.rfc-editor.org/info/rfc7515>, 59 pages.

Jones et al., "JSON Web Token (JWT) Profile for OAuth 2.0 Client Authentication and Authorization Grants", May 2015, [retrieved on Jan. 27, 2021], retrieved from: URL <https://www.rfc-editor.org/info/rfc7523>, 12 pages.

Jones et al., "JSON Web Token (JWT)", May 2015, [retrieved on Jan. 27, 2021], retrieved from: URL <https://www.rfc-editor.org/info/rfc7519>, 30 pages.

Jwt.io [online], "Introduction to JSON Web Tokens" Oct. 2015, [retrieved on Jan. 27, 2021], retrieved from: URL <https://jwt.io/introduction/>, 11 pages.

Raft.github.io [online], "The Raft Consensus Algorithm" Sep. 2015, [retrieved on Jan. 27, 2021], retrieved from: URL <https://raft.github.io/>, 11 pages.

* cited by examiner

LONG-LASTING REFRESH TOKENS IN SELF-CONTAINED FORMAT

CLAIM OF PRIORITY

This application claims priority under 35 USC § 120) to U.S. patent application Ser. No. 17/158,533, filed on Jan. 26, 2021, titled "LONG-LASTING REFRESH TOKENS IN SELF-CONTAINED FORMAT", the entire contents of which are hereby incorporated by reference.

TECHNICAL FIELD

The present disclosure relates to computer-implemented methods, software, and systems for secure data processing.

BACKGROUND

Software applications can provide services and access to resources. Resources may be restricted to a limited number of users based on authorization rules. For example, different access rights may be associated with different users and/or user roles. Tokens can be used to authenticate requests received at software applications to gain access to electronically restricted resources. Tokens can be used in addition or as an alternative to passwords and can be verified to determine whether to provide or otherwise allow access. When a user requests access to a resource, a security token may be provided by the user to be authenticated prior to accessing the resource. The security token can be validated to determine whether the request can be processed and whether the requests is valid. Access tokens may be generated with a predefined validity period. Access tokens may be renewed and generation of a new access token can be performed based on authentication through refresh tokens.

SUMMARY

The present disclosure involves systems, software, and computer implemented methods for generating a new access token in a secure manner based on relatively long-lasting refresh tokens in self-contained format.

One example method may include operations such as receiving, from a client application, a first request to generate a new access token for authorization of the client application with an application server, wherein the first request includes a first protected version of a refresh token to authenticate with the authorization server for generating the new access token, wherein the first protected version of the refresh token is an encrypted version of the refresh token based on a first client identifier, and wherein the refresh token is a self-contained token that is readable by the authorization server; decrypting the first protected version of the refresh token to determine content of the refresh token, wherein the decrypting of the first protected version is based on a second client identifier of the client application that is externally invoked for validating the authorization; in response to successfully decrypting the first protected version of the refresh token, performing a validation of the refresh token to determine whether to authorize a generation of the new access token for the client application; and in response to successfully validating the refresh token: generating the new access token; and providing the new access token to the client application. Other implementations of this aspect include corresponding systems, apparatus, and computer programs, configured to perform the actions of the methods, encoded on computer storage devices.

Implementations can optionally include that the first protected version of the refresh token can be generated by the client application based on the first client identifier of the client application and the refresh token.

In some instances, the first client identifier and the second client identifier can be identical.

In some instances, the example method may further include obtaining, from a key management tool, the second client identifier of the client application as a current client identifier for decrypting protected refresh tokens received with requests for generation of access tokens.

In some instances, the first protected version of the refresh token can be generated by encrypting the refresh token with the first client identifier, wherein the first protected version of the refresh token is decrypted based on the second client identifier, and wherein the first client identifier and the second client identifier are are symmetric keys generated for secure protection of exchanged information associated with the client application.

In some instances, a signature can be generated for the the refresh token based on the first client identifier and is sent together with the protected version of the refresh token to the authorization server.

In some instances, decrypting the first protected version of the refresh token may include: validating the signature of the first protected version of the refresh token, wherein the signature is validated based on the second client identifier.

In some instances, the first protected version of the refresh token that can be received as part of the first request to generate the access token includes the refresh token and a message authentication code. The message authentication code can be computed based on at least a portion of the refresh token and the first client identifier.

In some instances, successfully decrypting the first protected version of the refresh token to determine the content of the refresh token further includes decrypting the first protected version of the refresh token based on the second client identifier of the client application. In those instances, in response to successfully decrypting the first protected version of the refresh token with the second client identifier, the refresh token can be validated as a valid token for requesting the new access token.

In some instances, the refresh token can be a string representing an authorization granted and is associated with a first validity period, wherein the new access token is associated with a second validity period, and wherein the first validity period is longer than the second validity period.

In some instances, the refresh token can be generated by the authorization server. The refresh token can be associated with the client application and the application server.

In some instance, the example method may further include: receiving a subsequent request to generate a second new access token, wherein the subsequent request includes a second protected version of the refresh token, wherein the second protected version is a second encrypted version of the refresh token, wherein the refresh token is encrypted with a new client identifier different from the first client identifier to generate the second protected version of the refresh token; and replacing the second client identifier with a third client identifier that decryptes the second protected version of the refresh token, wherein the second and the third client identifier are persisted at a key store where a single version of a client identifier for the client application is maintained at any point in time.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description, the drawings, and the claims.

DETAILED DESCRIPTION

Figure 1:
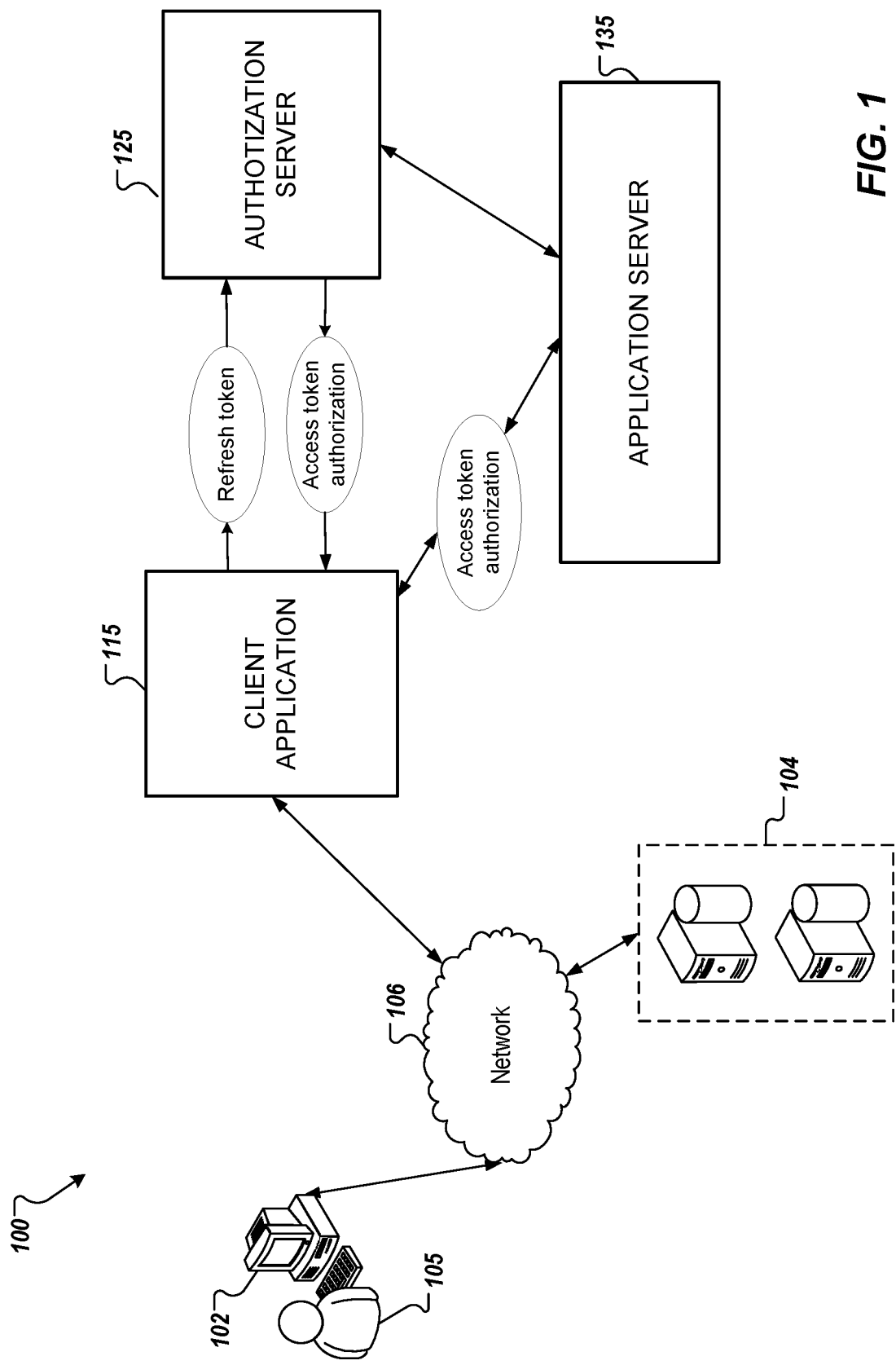
FIG. 1 illustrates an example computer system architecture for secure authentication and generating of access tokens based on relatively long-lasting refresh tokens in accordance with implementations of the present disclosure.

The present disclosure describes various tools and techniques for generating new access tokens in a secure manner based on relatively long-lasting refresh tokens in self-contained format. In some instances, a long-lasting refresh token in a self-contained format can be used in a protected form to request generation of access tokens in a secure manner to leverage a possibility that a security breach associated with the refresh token can violate a secure access token generation. In some cases, even if a refresh token is reported as stolen, as an access token can be requested based on a protected version of the refresh token, the same refresh token does not necessarily need to be regenerated or revoked, and can be used to request the access token. In some instances, a long-lasting refresh token can be used several times for issuing access tokens without regeneration.

In some instances, client applications can communicate with application servers and request for data and resources. The communications between the applications can be secure communications, such as where the client application authenticates itself at the application server, for example, through provided identity data of the requestor (e.g., a user and/or a client application, among others).

When a user requests resources from an application server through a client application, the application server may verify the identity of the user requesting the resources and/or the client application sending the request. Such verification may be performed by verifying a security access token provided with the request or, alternatively, in a separate authentication interaction or exchange separate from the request. The access token can be used to exchange information about the identity of the user between the client application and the application server. In some instances, the access token can include information that facilitates sharing of identity and security information in an environment associated with multiple entities and domains. The access token may be issued by an identity provider, and can be verified by the application server based on a verification algorithm. For example, a client application may be provided with an access token that is issued by a security authorization server, where the access token can be used for authorizing requests sent to the application server.

In some instances, an access token can be a software token that can be exchanged between communicating parties and that can be validated based on a security key validation. The security token can be provided together with a request sent from a client application to an application server to authenticate the request and the user. In some instances, an access token can be generated in a given format to encode security information for the identity of a user and/or a client application. In some instances, the access token can be a self-contained security token that can be read by the receiver (i.e., the application server) to validate the identity of a requestor and to provide access to resources. For example, the security token can be an access token for accessing an application, such as a JSON Web Token (JWT).

In some instances, an access token that is self-contained may not be persisted in a storage, database, or other type of storage space. Further, and due to its self-sufficient nature, secure validation of the access token's authenticity, and thus, that of the associated requestor (e.g., a user and/or application) can be performed. Self-contained security tokens may include information about the authorized entity and scope of authorization, and may be validated by the receiver without validating the token at a separate server, data storage, or other storages where security tokens can be persisted.

In some instances, a user and/or a client application can request issuance of an access token by a security provider. Then, when communication is initiated by the user through the client application, the access token issued by the security provider can be validated by the application server to determine whether the client application can obtain access to the requested resources. The security provider can support validation of security tokens, as well as issuance of new security tokens. Using the validation and issuance of the security tokens, the security provider can enable a client application to obtain access to resources from the application server. In some instances, an access token's lifetime may be set to a predefined validity period. The validity period can be determined according to security requirements associated with the client application and/or the application server. For example, the validity period may be set to eighty-six thousand and four hundred (86400) seconds (i.e., 24 hours). The validity period may be based on a type of services provided by the application server, the type of the client application, other considerations with the communicating parties and the exchanged data, or a combination or subset thereof. For example, an access token for accessing resources from a banking application may expire more quickly than an access token used for accessing an online media application.

In some instances, when a user requests issuance of an access token at an authorization server through a client application, the authorization server may generate the access token as well as a refresh token that can be used for subsequent generation of additional access tokens. The generation of the access token and the refresh token can be performed simultaneously, or as separate independent actions. The refresh token can be stored by the client application, and can be used later as credentials to obtain new access tokens from the authorization server. In some instances, if an access token expires, the client application can request the generation of a new access token based, at least in part, on the valid refresh token. For example, subsequent access tokens can be used to replace an expired access token or to replace an access token that is illicitly or accidentally obtained by an unauthorized party.

In some instances, the refresh tokens are issued to the client application by the authorization server and are used to obtain a new access token when the current access token becomes invalid or expires, or to obtain additional access tokens with identical or narrower scope. In some instances, a refresh token can be a security token having the same format as an access token. The refresh token can be a string representing authorization granted to the client application to allow for issuance of new access tokens by the authorization server for use with the application server. In some instances, refresh tokens may be used with the authorization server, but may not be exchanged with an application server. In those instances, the refresh tokens cannot serve as access tokens by themselves, and may only be used to request the generation of new access tokens.

In some instances, access tokens can be used in the context of executing processes at the application server, where access tokens are used to authorize access to resources provided by the application server. When access tokens are generated, they are defined with a validity period (e.g., ten (10) hours). In some instances, the executed processes can extend in time and be longer than the defined validity period of an access token. For example, a single execution of a process may last for approximately twenty (20) minutes, while validity period for an access token may be eight (8) minutes. In that example, three access tokens may be necessary to cover for the execution of the whole process. When a first access token is generated for authorizing requests sent from a client application to the application server, a refresh token may also be issued and provided to the client application For subsequent requests to generate new access tokens, the issued refresh token can be used to authorize the additional access key generations. When the refresh token can be used multiple times (e.g., at least two) without the need to be regenerated by the authorization server while maintaining secure access token generation process, the refresh token can be considered or referred to as a long-lasting token for authorization of access token generation. In some instances, to support execution of processes at the application server, new access tokens can be generated based on long-lasting refresh tokens, where the long-lasting refresh tokens are self-contained tokens not persisted in database storages or other storage spaces for secure tokens. Long-lasting refresh tokens may be security tokens that are generated and provided by an authorization server.

In some instances, the authorization server may generate refresh tokens and support generation of new access tokens without regeneration of the refresh tokens. For example, a generated refresh token may be associated with a long-lasting validity period (e.g., a validity period that is twice as long as the validity period of an access token, having a validity period that is three times as long as the validity period of an access token, or other correlations between the validity periods of the refresh tokens and access tokens, where the refresh token's lifetime is longer than that of an access token). In additional examples, a generated refresh token may be maintained as a long-lasting refresh token by the authorization server, where a single refresh token can be used for requesting generation of several access token. In some instances, a single refresh token can be defined to have a validity period that corresponds to a number of times that is used to request generation of new access tokens and can be associated with a predetermined number of generation requests. Further, a combination of i) a validity period defined as a period extending the validity period of an access token and ii) a predefined count of a number of requests for generation of new access tokens can be defined for maintaining refresh tokens as long-lasting tokens. In some instances, a predetermined condition for the lifetime of a refresh token can be defined at the authorization server. For example, when a refresh token meets the predetermined condition, the refresh token may not be required to be regenerated, and when the refresh token does not meet the predetermined condition, the refresh token may be automatically regenerated and provided to the client application to replace the previous refresh token. For example, the predetermined condition may define that the lifetime of a refresh token extends for thirty (30) minutes and up to four (4) requests for generation of new access tokens. If the refresh token is used for four times and a fifth attempt is made within this thirty-minutes period, the refresh token can be used to generate a fifth new access token and when the access token is provided, a new version of the refresh token can also be provided, e.g., together with the access token or as a separate interaction.

In some instances, if there is a security breach associated with a refresh token, then the refresh token may be required to be revoked. For example, revocation can be initiated in response to determining that the refresh token has been potentially stolen by an unauthorized party. If a refresh token has to be revoked in response to a potential security breach event, the lifetime of refresh tokens can be reduced to lower risk of potential unauthorized requests based on leaked refresh tokens. In some instances, in order to be able to use refresh tokens as long-lasting tokens even when the refresh token is potentially associated with a security breach, the refresh token can be protected by the client application by using a protected version of the refresh token based on a client identifier to request new access tokens. The use of a protected version of the refresh token may allow that the lifetime of the refresh token as issued by the authorization server is not reduces while security is maintained.

In some instances, to provide a secure yet efficient way of requesting issuance of access tokens based on long-lasting refresh tokens, a new access token can be requested by a client application at an authorization server based on a protected version of the refresh token. The protected version of the refresh token can be generated (e.g., by encrypting the refresh token) by the client application and decrypted by the authorization server if the request for generating a new access token is to be authorized. By using the protected version of the refresh token, the refresh token can be used multiple times to request generation of access tokens while maintaining a secure access token generation process.

When refresh tokens are stolen, the stolen token has to be revoked or blacklisted, as the token could possibly be used by unauthorized parties to issue new access tokens and to falsely authenticate the corresponding user or entity at the application server to consume resources and access otherwise secure or private information. In some cases, determining whether a refresh token has been stolen may occur well after the refresh token has been maliciously used to request new access tokens and provide unauthorized, but otherwise valid, access tokens to request resources from an application server. Thus, to improve security during generation of access tokens, refresh tokens should support a secure process for authentication.

In some prior implementations, each time a refresh token is used to request a new access token, the refresh token may be reissued as a new refresh token, and the prior version of the refresh token may be revoked. However, if refresh tokens are reissued very frequently, refresh tokens would have a shorter lifetime compared to the lifetime defined for the long-lasting refresh tokens. In some instances, one refresh token may not be able to support authorization during a process execution that involves multiple access tokens and various interactions. Since multiple access tokens have to be issued during the execution of a single long-lasting process, one refresh token that can be used multiple times can support more efficient access token generation. Thus, to provide efficiency while maintaining high security standards for issuing access tokens, a protected version of a refresh token may be used. In some instances, the authorization server may implement a validation process for protected refresh tokens to determine whether to generate a new access token when successfully decrypting the protected version of the refresh token and validating the content of the encrypted refresh token.

In some instances, the protected version of the refresh token can be generated by the client application based on a client identifier. The authorization server may need a corresponding decoding identifier, the same client identifier or a matching client identifier, or other decoding key to be able to determine whether the protected version of the refresh token is originating from the client application and is associated with a legitimate request that can be validated based on the contents of the refresh token to determine whether to generate a new access token. The authorization server can decode the protected version when the protected version is generated by a legitimate client identifier verifiable by the decoding party. For example, if the protected version of the refresh token is generated based on a first client identifier, and that first client identifier is not an authenticatable client identifier originating from the client application, then the authorization server may not be able to decode the protected version of the refresh token, as this protected version was not generated by an authorized client application. In this example, the authorization server may invoke a decoding identifier from an authorized client application in an attempt to decode the protected version that is received. If the invoked identifier does not decode the protected version, the authorization server may reject the request to generate a new access token.

In some instances, even after a refresh token has been potentially stolen by an unauthorized party, the same refresh token can be used for a subsequent request for a new access token if the refresh token is encrypted or otherwise encoded and provided in a protected version (or form) that uniquely identifies the client application as a requestor. The new access token can be requested based on the protected version of the refresh token and, if the authorization server can decrypt the protected version of the refresh token to read the content of the refresh token, the new access token can be provided.

The protected version of the refresh token can be generated in different ways by using a client identifier such that the protected version can be uniquely identified as coming from the client application. For example, the client identifier may be a security key generated for the client application. In some instances, the protected version of the refresh token may be generated by the client application by encrypting the refresh token based on a first client identifier. In some other instances, the protected version of the refresh token may be generated by generating a message authentication code that can be sent together with or separately from the refresh token when requesting generation of a new access code.

In some instances, when the protected version of the refresh token is received and is related to a request for generation of a new access token, the protected version can be decrypted based on a second client identifier that is invoked by the authotization server, for example, from a key storage of the client application. In some instances, the first and the second client identifier can be identical, or can be a matching pair of keys used to encrypt and decrypt the refresh token. For example, when the first and second identifier are a key pair used to encrypt a refresh token and to decrypt a protected version of the refresh token, the first client identifier (e.g., as a public key of the pair) can be used to generate the protected version by the client application, and the second identifier (e.g., the private key of the pair) can be used by the authorization server to decrypt the protected version of the refresh token. In those examples, the authorization server may store the private key while the client is provided only with the public key. In this way, security is improved, as the client does not have to store and securely protect the private key, as the private key is only owned by the authorization server.

In some instances, the first and the second client identifier can be equivalent and represent a symmetric key for encrypting and decrypting refresh tokens.

In some other instances, the first client identifier can be used to sign the refresh token, where the signature can be provided together with the refresh token, or as in an additional exchange interaction. In some instances, the protected version of the refresh token includes the signature and the refresh token. The protected version of the refresh token can be validated by validating the signature generated for the refresh token, where the signature is provided with the protected version of the refresh token.

FIG. 1 depicts an example architecture 100 in accordance with implementations of the present disclosure. In the depicted example, the example architecture 100 includes a client device 102, a network 106, and a server system 104. The server system 104 includes one or more server devices and databases. In the depicted example, a user 105 interacts with the client device 102.

In some examples, the client device 102 can communicate with the server system 104 over the network 106. The client device 102 may include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems receives and evaluates requests for application services, and, where appropriate, provides such services to any number of client devices (e.g., the client device 102 over the network 106).

In accordance with implementations of the present disclosure, and as noted above, the network 106 can be associated with a client application 115 that is communicatively coupled to a server application 135.

In some instances, access tokens can be used in token-based authentication processes to allow the client application 115 to access an application programming interface (API) of the application server 135. In some instances, the user 105 may access the client application 115 through the network 106. The application server 135 may include application logic implemented to provide services and resources to end users. To respond to requests received from the client application 115, the application server 135 performs identity verification on validates the received requests, where the validation can be used to determine whether the requests are associated with an authorized user. In some instances, the client application 115 sends an access token as a credential to authenticate a request for a resource send to the application server 135. The access token can be generated for the client application 115 by an authorization server 125, which may be separate and unrelated, in some cases, to the application server 135. Prior to sending a request to the application server 135, the client application 115 generates the access token at the authorization server 125. In some instances, the client application 115 can authenticate with the authorization server 125 based on user credentials and security password to generate an access token.

In some more instances, when an access token is generated, a refresh token can be also generated, where the refresh token can be used for later generation of subsequent access tokens that can later replace the first or initially generated access token. The refresh token can then be used as an identifier to associate a newly generated access token with the client application 115, and can be used to generate the content of the new access token so that the new access token can be validated by the application server 135.

The client application 115 may receive an access token after a user successfully authenticates and receives authorization access from an authorization server 125. The authorization server 125 can provide the access token as a credential that can be used or included in communications when the client application 115 calls the target API of the application server 135. The access token can include information that is provided to the API to validate the access token and, by extension, the corresponding requestor. By validating the access token, the application server 135 can determine whether to authorize access to the API and perform specific actions within the scope granted during authorization with the access token.

In some instances, the authorization server 125 can issue an access token for the client application 115 based on a request from a user. The access token may be used to obtain access to the application server 135. The access token may be defined with a validity period and may be a self-contained security token. In some instances, an access token may expire, be reported as stolen, or may be associated with other conditions or events that require revocation of the access token. For example, revocation can be required if a security breach has occurred where the access token has been potentially stolen by or exposed to an unauthorized party.

In some instances, the authorization server 125 may generate a refresh token that can be used as a credential to request a new access token. In some instances, same or substantially equal requirements and generation processes may apply for the issuance of refresh tokens by the authorization server 125 as for the access token generation. The refresh tokens can be used to request generation of a new access token, where the new access token replaces an already expired or revoked access token. In some instances, replacing of an access token with a new access token does not include invalidation of a previous access token. A generation of a new access token can be performed even if a previous access token is still valid and the validity of the previous access token may stay unaffected. In some cases, a user may want to generate a new access token to replace the previous token and/or to generate an additional access token associated with same authorization rights.

In some instances and as discussed above, the refresh tokens generated by the authorization server 125 may be a self-contained token that can be used as long-lasting refresh tokens that can be used multiple times to issue new access tokens, while still maintaining secure generation procedures. As discussed above and throughout the present disclosure, the client application 115 can receive a refresh token from the authorization server 125 and may generate a protected version of the refresh token. The protected version of the refresh token can be used for or with a subsequent new access token request that is sent from the client application 115.

In some instances, the client application 115 may receive a refresh token from the authorization server 125, where the refresh token may be also associated with a validity period. The refresh token may be issued by the authorization server 125 and signed with a private key of the authorization server 125. In some instances, the refresh token may be reported as stolen, and a request for generation of a new access token based on an unprotected version of a refresh token may lead to a risk of unauthorized issuance of a new access token.

To facilitate generation of new access tokens while using a refresh token throughout its lifetime and validity, the request for the access token generation can be performed using a protected version of the refresh token. The protected version of the refresh token may, for example, be encrypted with a client identifier of the client application 115. In some instances, the protected version of the refresh token may be generated prior to sending a request for generation of a new access token. In some instances, the protected version of the refresh token can be generated based on a currently maintained version of a client identifier. If a previous version of a protected version of the refresh token is leaked, or the refresh token is leaked, a change in the version of the client identifier maintained by the client application 115 can be performed to provide secure measures to generate new access tokens. In these cases, the client application 115 can dynamically change or otherwise update the version of the client identifier and control the secure exchange of information to generate a new access token. When a client identifier is changed and a new identifier is used to generate the protected version of the refresh token, the new protected version of the refresh token cannot be decrypted based solely on knowledge of the previous version of the client identifier and/or a corresponding decrypting identifier. By changing the client identifier, the effect of the change can be limited to the refresh token that is associated with an unauthorized leak, providing improved security. In some instances, as the client application 115 requests new access tokens based on a protected version of the refresh token rather than on the refresh tokens (referred as a non-protected version), the risk levels associated with security breaches due to leaked refresh tokens are lower as compared to where the requests for new access tokens are based on the non-protected version of the refresh token (e.g., the refresh token as generated by the authorization server and provided to the client).

In some instances, when a request for generation of an access token is received at the authorization server 125 that provides security services, the request for the access token generation can include a protected version of a refresh token that is generated based on a client identifier associated with the client application associated with the request. The client identifier can then be used to validate the authenticity of the request as originating from the client application 115. Further, the generation of the new access token can be based on validation of the protected version of the refresh token, which may be provided together with or as a separate operation to the request for the new access token generation. In some instances, the refresh token validation can be performed by interactions between the application server 135 and the authorization server 125 to determine whether the refresh token is validly issued. In situations where the refresh token is stolen, a validation that is performed based only on the refresh token rather than on a protected version of the refresh token may not recognize that, even if the refresh token has been validly issued, the refresh token should still not be validated. For example, a refresh token can be considered invalid, even if validly issued initially, when the token is associated with a prior revocation notice from the client application 115. By performing two-level validation of requests for generation of new access tokens, security can be improved, and protection can be provided in response to requests associated with invalidated refresh tokens.

In some instances, the client identifier used in requesting a new access token and associated with encrypting the refresh token to generated a protected version of the refresh token can be a client secret key that can be used to compute a message authentication code or other unique identification key, where that client identifier can be included in the protected version of the refresh token. In some instances, the protected version of the refresh token can include the computer message authentication code and the refresh token. In some instances, the client identifier can be associated with various parties, depending on the implementation and a configured granularity for the refresh token generation. For example, the client identifier can be generated and used on a client application level, user level, or alternatively, based on a subscription level. In the example of subscription level, a subscription account can be defined to group users that access the application server 135 through the client application 115. In some instances, based on the definition (and granularity of the definition) and usage of the client identifier, the generation of the protected versions of the refresh token can be controlled. In some instances, a number of refresh tokens can be managed in a common way, such as, by encypring the refresh tokens with a common client identifier to generate corresponding protected versions. Thus, the number of refresh tokens can be managed as a group in cases of a potential breach.

In some instances, generation of refresh tokens based on client identifiers can move the responsibility for handling revocation requests of an issued refresh token from the authorization server 125 to the client application 115, as the client identifiers used for the generation of the refresh tokens can be used to generate protected versions of the refresh tokens, where the refresh tokens are managed by the client application 115. Thus, the client application 115 can more efficiently take actions when provided with a notice for a leak of refresh tokens, and can regenerate a protected version of an issued refresh token in response to a revocation request. To address the revocation request, the client application 115 can revoke its identifier, for example, by regenerating it, rather than blacklisting or revoking the refresh token at the authorization server. If a revocation is performed on an authorization server level, such revocation may have an effect on other issued tokens that may not associated with the refresh token specifically identified as leaked.

Figure 2:
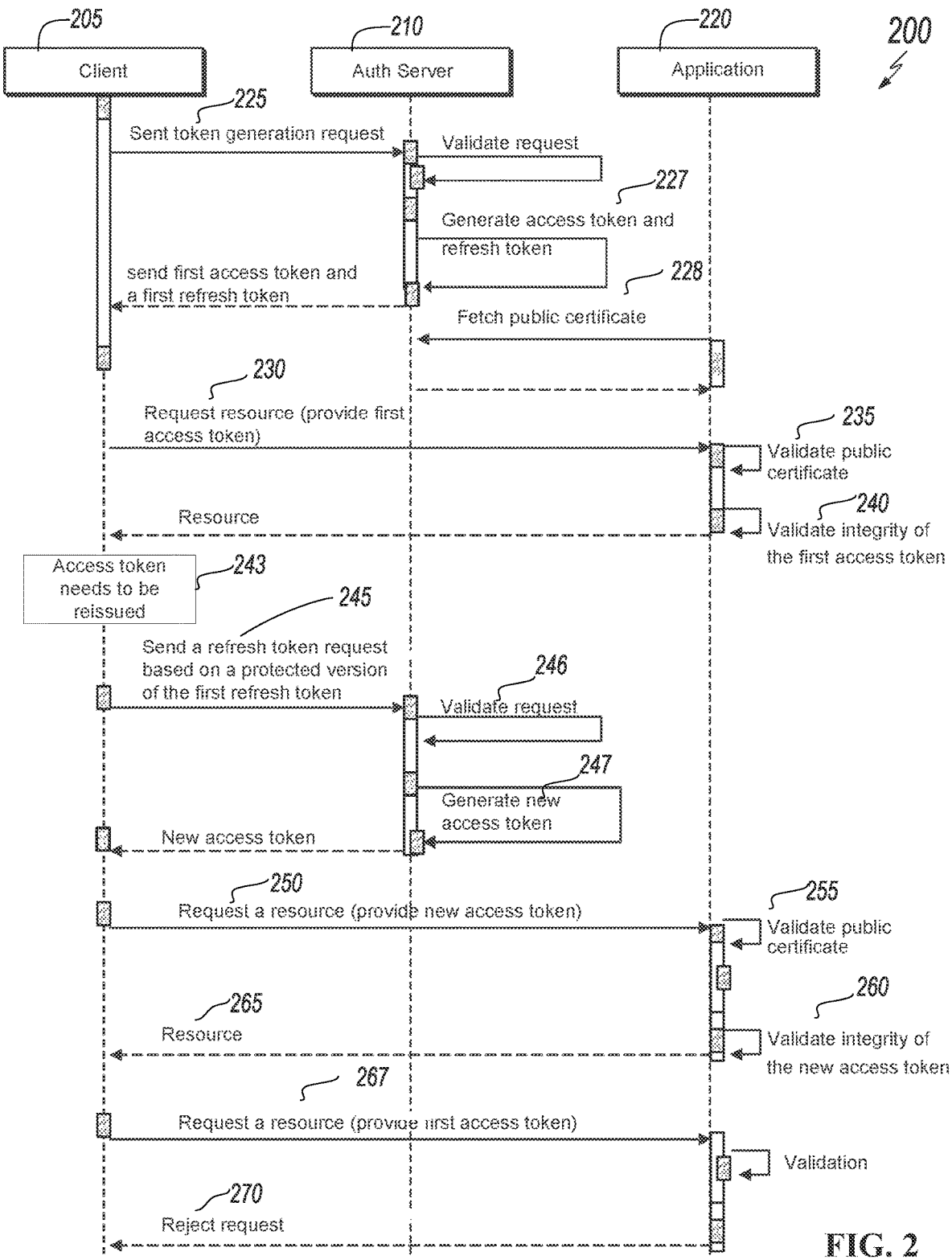
FIG. 2 is a block diagram for an example system for generating access tokens based on protected long-lasting refresh tokens in accordance with implementations of the present disclosure.

FIG. 2 is a block diagram for an example system 200 for generating access tokens based on protected long-lasting refresh tokens in accordance with implementations of the present disclosure. The example system 200 includes a client 205, an authorization server 210, and an application 220. The client 205, the authorization server 210, and the application 220 may be similar to, for example, the client application 115, the authorization server 125, and the application server 135 of FIG. 1.

In some instances, the client 205 and the application 220 are communicatively coupled in relation to implemented services at the application 220, where the client 205 invokes resources from the application 220. When the client 205 sends requests to the application 220, these requests are associated with users of the client 205, where the requests themselves may include or otherwise identify identity credentials associated with client 205, where the identity credentials can be used by the application 220 to determine whether the request is valid and authorized to be served.

In some instances, the client 205 may send a token generation request to the authorization server 210 at 225. In some instances, the authorization server 210 may implement an industry-standard protocol for authorization, such as the OAUTH 2.0.

At 227, the authorization server 210 validates the requests and generates an access token and a refresh token. The access token and the refresh token may be self-contained tokens as discussed above and in relation to FIG. 1. The access token and the refresh token may be generated with the same or different validity periods. For example, the refresh token's validity period may be longer compared to the access token validity period. In some examples, the validity period of the refresh token may be two days (i.e., 48 hours), and the validity period of the access token can be eight (8) hours. In those examples, the access token may be used for authorization of a process that is as long as the validity period of the refresh token, or, alternatively, the validity period of the refresh token can be defined as two, three, four, etc, times longer than the validity period of an access token. In some instances, the validity period of the refresh token and the validity period of the access token can be configurable parameters that can be provided to the authorization server when requesting to generate those. The validity periods as parameters may be defined is association with the processes that are to be executed at an application server based on authorization performed according to access token validation.

Once generated, the access and refresh token may be provided to the client 205. The client 205 may use the access token to request access to provided resources related to processes executed at the application 220. The application 220 may implement logic that supports execution of processes that are associated with a time period that is longer than the time period corresponding to the validity period of one access token. Thus, several access token generations may be associated with one process execution. Therefore, the client 205 communicates with the authorization server 210 to request new access tokens using the refresh token during the process execution. In some instances, the generated access token and the refresh tokens at 227 can be JWTs that provide a compact and self-contained way for securely transmitting information between parties as a JSON object. The security tokens may be signed and/or encrypted. The structure of an access token and/or a refresh token, such as the JWT with a signature, includes three parts: a header, a payload, and a signature. For example, a JWT can have the following format: Header.Payload.Signature. The header may include information for the type of the token and the signing algorithm being used. The payload of the security token (e.g., the access token, the refresh token, or other types of tokens) can include claims that include statements about an entity (for example, the user) and additional data. The claims may include information that is relevant for an authorizing party to review when validating an access token. For example, the claims may include at least one or a combination of user first name, last name, email, customer tenant/subscription, client application identifier, a unique value that identifies the token itself, or other information. In some instances, the signature part of the token can be created in any suitable manner, including combining (e.g., concatenate, merging, etc.) data which may include, for example the encoded header, the encoded payload, a public key, and an identification of the algorithm to be specified in the header, and then using any suitable cryptographic method of signing the resulting combination of data.

In some prior solutions, even though the security tokens can be self-contained and guaranteed based on their integrity, a stolen token cannot be revoked without affecting other tokens issued by the same authorization server if the tokens are issued and authenticated only based on a public and private key pair of the authorization server. If a security token is requested to be revoked from an authorization server, the authorization server may revoke its security keys or credentials that are also related to other security tokens issued by the same authorization server. To avoid this issue, the long-lasting refresh token can be acquired at the client application upon issuance from the authorization server, and can be encrypted to generate a protected version of the long-lasting refresh token at the client application. The protected version of the long-lasting refresh token can then be used when requesting reissuance of a new access token at the same authorization server. The generation and use of protected versions of refresh tokens at the client application allow for a more nuanced and efficient method for allowing access token reissuance and management in a secure manner.

At 230, the application 220 receives a request from the client 205 associated with a first access token, where the first access token can be included in or associated with the request, and where the first access token can be identified and validated. In particular, at 235, the access token can be validated to determine whether the access token is validly issued by a security identity authority. Validation can be performed by the application 220 using a public key or a certificate of the authorization server 210. In some instances, the public key or certificate can be acquired from the authorization server 210, prior to receiving the resources for the resource at 230, as presented on FIG. 2, at 228. In some more instances, the public key or certificate can be acquired as part of the validation of the access token analyzed for the request at 230, or at any time prior to executing the validation. In some other instances, the validation of the received access token can be performed at an entity coupled to the application 220 that may handle access token validation asks. Any suitable validation technique can be used at this operation. Once the validation at 235 is successfully performed, the integrity of the first access token can be validated at 240. The validation of the integrity of the first access token can be performed by validating the claims that are defined in the payload part of the token. By validating the integrity of the first access token it can be determined whether the first access token can provide access to the requested resource at 230. If the validations of 235 and 240 are performed successfully, and the first access token is validated, then the application 220 may provide requested resources to the client 205.

In some instances, at 243, a new access token may need to be issued. The reason for the reissuance may be the receipt of a notification from a monitoring service that can provide an indication of a potential fraud, security breach, leak of the previous version of the access token, or a regular security update for security tokens, or other event that can be configured at the monitoring service. In some other example, the event may be associated with a request for reissuance from a user of the client 205.

In some instances, and as discussed in relation to FIG. 1, the client 205 may generate a client identifier, which may be an identifier value, a secret key, or any other identifying information, which may be incorporated into a protected version of a refresh tokens and used to request generation of a new access token for the client 205 by the authorization server 210. The client identifier may not be part of the refresh token that is used for generating the protected version of the refresh token. The client 205 may store the client identifier at a key management storage, which may be a security storage component for storing security keys associated with the client 205. In some examples, the key management storage may be a VAULT storage, database, table, or other component for securely storing keys and credentials.

At 245, a new access token generation request is sent from client 205 to the authorization server 210. In some examples, the token that is requested may be generated in a JWT format. In some instances, the token generation request includes a protected version of the first refresh token that is received at the client after the generation at 227. The protected version of the first refresh token is sent for authenticating a request sent to the authorization server 210, where the request is for generation of a new access token at the authorization server 210. For example, a new access token may be requested to be generated when the previous version of the access token has expired, when the previous version has been reported as leaked or associated with a security breach, or any other relevant event notification or detection that can trigger a new access token generation process to ensure ongoing security. In some instances, based on a generation of a new access token, a previously generated access token by the authorization server is not automatically invalidated. In some instance, if a previously generated access token is associated with a security breach or other data leakage of confidential information, the previous access token can be instructed to be invalidated. For example, invalidation of an access token can be executed as a separate process and based on implemented logic at the client application and/or the authorization server.

In some instances, the protected version of the refresh token can be generated through a previous operation at the client 205 based on the client identifier. For example, the protected version of the refresh token can be an encrypted version of the refresh token based on the client identifier, or the refresh token may be generated using the client identifier to generate a message authentication code that can be submitted with or as a separate request from the request (245) to generate the new access token.

In some instances, the protected version of the refresh token is generated at the client and provided for validation. The protected version is decrypted based on a client identifier identified by the authorization server for purposes of the decrypting. For example, the client identifier that can be used to decrypt the protected version of the refresh token may be provided directly to the authorization server by the client application, may be shared to the authorization server through an intermediary entity, or may be requested from a shared storage accessible by the authorization server, among other secure examples of sharing the identifier.

In some instances, the authorization server 210 may validate the request at 246. The authorization server 210 may include implemented logic for processing requests to generate new access tokens, including validating the requests based on decrypted a client identifier and validating the received refresh token. The validation of the request may include decrypting the protected version of the refresh token by using a client identifier corresponding to the client identifier used to encyrpt the refresh token. The client identifiers used for encrypting and decrypting the refresh token may be identical or may be a private-public key pair that supports secure transfer.

In some instances, the client identifier used for the validation can be identified based on the received request. In some instances, the received request may provide information for locating the client identifier. In other instances, the authorization server 210 may be provided with identification of a location for retrieving the client key through a separate transaction or with an additional configuration setup prior the generation of the requested token. For example, the sharing of information for locating the client key may be performed during a previous interaction between the authorization server 210 and the client 205. In other instances, the authorization server 210 may incorporate the security storage component 215 and may invoke information for the client key internally.

In some instances, the client 205 generates the protected version of the refresh token by either encrypting the refresh token based on the client identifier or by generating a signature and provide a message authentication code for the refresh token. The message authentication code can be provided together with the refresh token or as a separate object related to the refresh token.

In the implementations where the protected version of the refresh token is generated through the use of a message authentication code, the message authentication code can be computed at the client 205 based on a payload portion of the refresh token by using the configured or specified in the client assertion claims algorithm. At the authorization server 210, the message authentication code can be computed again based on the refresh token payload using the specified algorithm in the refresh token header. After successful computation of the message authentication code, the value of the code can be compared for equality with the code included as part of the protected version of the refresh token. If they are equal, then the request can be allowed, otherwise it can be rejected. In some instances, to accept a refresh token, the refresh token has to be determined as valid, and a validation of the message authentication code can be performed. The protected version of the refresh token is generated to include the message authentication code as computed using the client identifier. In some instances, the computed message authentication code can be part of the protected version of the refresh token.

At 247, the new access token is generated and provided to the client.

At 250, the client 205 requests a resource by providing the new access token generated at 247. At 255, the new access token is validated based on the public certificate of the authorization server, and at 260, the integrity of the new access token is validated. Based on successful validations, the resources is provided at 265.

At 267, a resource is requested by the client 205 from the application 220 in a separate attempt, where the request provides the first access token for authorization to receive the resource. A validation process is performed on the first access token. As the access token was reissued at 243, if the access token might have expired, and thus the validation would be not successful, and the request can be rejected at 270. While not illustrated in FIG. 2, in some instances, even if a new access token has been issues, the original or prior tokens may still be valid for a time interval or other period. This may occur where the new token is generated just prior to an earlier token's expiration, or in other situations or circumstances. Therefore, if the validation related to the requests 267 is successful as the access token is still valid, the requested resource may be provided. The issued token can be provided to the client 205.

Figure 3:
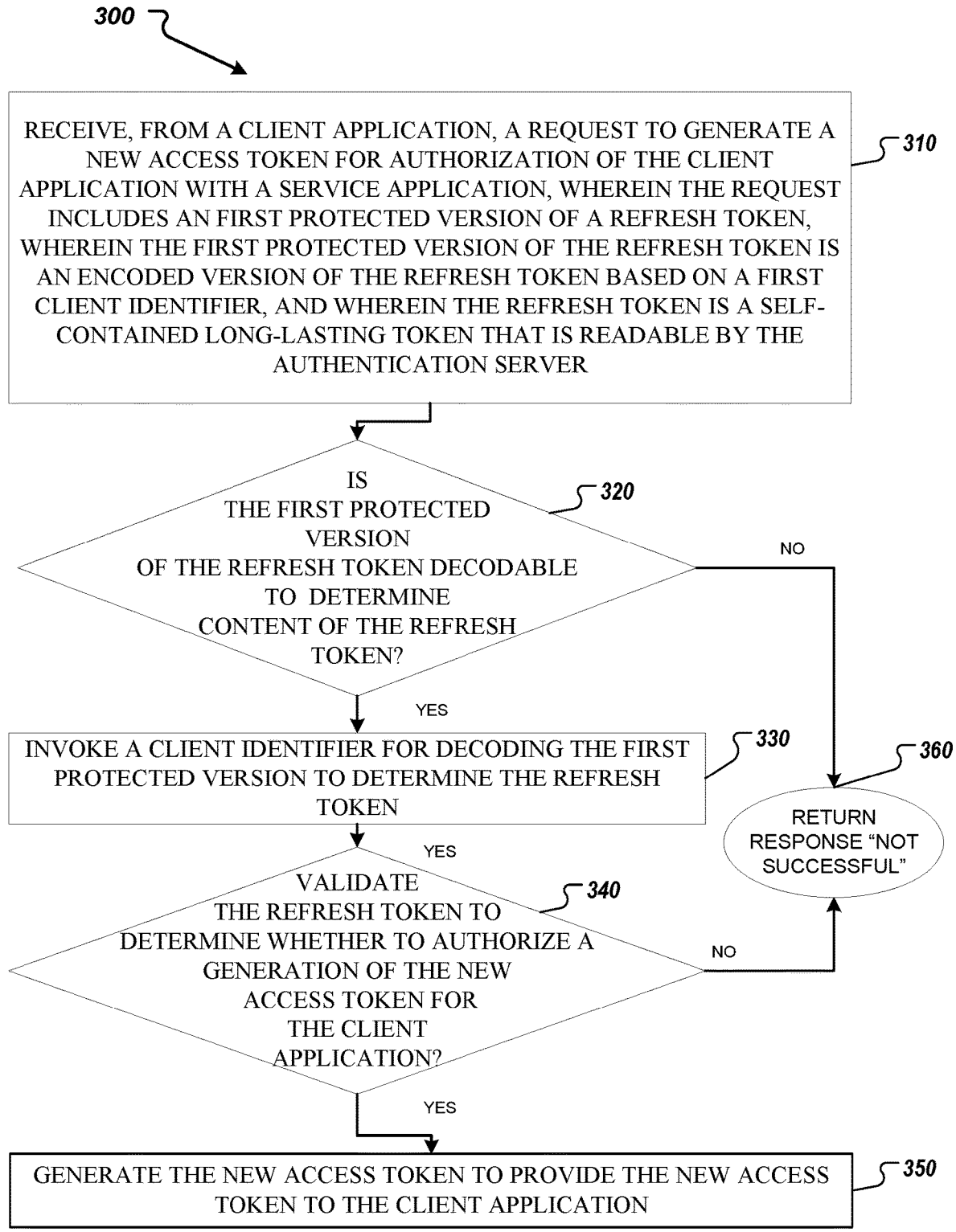
FIG. 3 is a block diagram for an example method for securely generating access tokens based on protected refresh tokens in accordance with implementations of the present disclosure.

FIG. 3 is a block diagram for an example method 300 for securely generating access tokens based on protected refresh tokens in accordance with implementations of the present disclosure. In some instances, the example method 300 may be executed at an authorization server. The authorization server can be as the authorization server 125 of FIG. 1, the authorization server 210 of FIG. 2, and throughout this disclosure.

At 310, a first request is received at an authorization server from a client application to generate a new access token for authorization of the client application with an application server. The first request includes a first protected version of a refresh token to authenticate with the authorization server for generating the new access token. The first protected version of the refresh token can be an encrypted version of the refresh token based on a first client identifier. The refresh token can be a self-contained long-lasting token that is readable by the authorization server. In some instances, the self-contained long-lasting token may be a security token that can be validated by an application server without querying a database and based on a validation according to a public key or else of the authorization server that issued the token. The self-contained long-lasting token can be a token that can be used as part of the validation of multiple request for generation of new access tokens sent by the client application. The self-contained long-lasting token can be used several times without the need to be regenerated while maintaining a secure validation of the authenticity and integrity of the provided information through the token itself. The self-contained long-lasting token can be used in this secure manner because when a request for a new access token is sent by the client application, the request includes a protected version of this self-contained long-lasting token rather than the self-contained long-lasting token in a non-protected version from the client application requesting the new access token. The protected version of the self-cotnained long-lasting token may be generated by the client application or at a connected entity and based on a client identifier.

In some instances, the refresh token can be previously generated by the authorization server and provided to the client application for requesting of issuance of new access token for authorization of the client application with an application server. The refresh token can be used as credentials to authenticate for the access token generation.

In some instances, the protected version of the refresh token can be generated as discussed above and in association with the description of FIG. 1 and FIG. 2. The first protected version of the refresh token can be generated by the client application based on a first client identifier of the client application and the refresh token. The first client identifier can be a client identifier generated by the client application and stored at a key storage space. The client application can maintain latest current versions of client identifiers that can be used for encrypting refresh tokens. In some instances, a different client identifier with a correspondingly current version can be associated with a first refresh token compared to the client identifier associated with a second refresh tokens. In some instances, one client identifier can be shared between multiple refresh tokens for authentication for different application server. In some instances, a group of refresh tokens can be managed as a single unity that can be encrypted with the same client identifier and managed in a similar manner.

At 320, a determination is made as to whether the received first protected version of the refresh token is a decryptable protected version of a security token that has to be decrypted by the authorization server. If the protected version is decryptable, method 300 continues at 330. Otherwise, method 300 moves to 360.

At 330, a client identifier is invoked for decrypting the first protected version. The client identifier is invoked for authorization validation of the request received at 310. In some instances, the invoked client identifier can be a second client identifier that can be the same as the first client identifier and can be used to decrypt the protected version of the refresh token. In some other instances, the invoked client identifier can be a second client identifier that can be a matching or corresponding key to the first client identifier (i.e., not identical, but related to) and can be used to decrypt the protected version of the refresh token. In some instances, the invoked client identifier may be a second client identifier that cannot decrypt the protected version of the client identifier. In this instance, the invoked client identifier may not match the client identifier used for generating the protected version of the refresh token, for example, because the protected version of the refresh token is not a version that can authorize generation of a new access token. For example, the protected version may be fraudulently generated, or generated based on a previous client identifier that is no longer maintained by the client application as a valid client identifier for decrypting protected versions of refresh tokens.

If the received first protected version of the refresh token is determined to be not decryptable at 320, then at 360, a response to the requesting client application can be returned providing notification that the requests is not successful.

If the first protected version is determined as decryptable based on the invoked client identifier at 330, then at 340, the protected version of the refresh token is decrypted to determine the content of the refresh token, and the refresh token is validated to determine whether to authorize a generation of a new access token for the client application. The authorization validation for the refresh token includes determining whether the refresh token is validly issued by the authorization server.

If the validation is successful, at 350, the new access token is generated and provided to the client application. If the validation is not successful, method 300 continues at 360, and a response is returned that the request is not successful and not new access token is generated.

In some instances, a subsequent request to generate a second new access token can be received. For example, a subsequent request may be triggered from a notification that the first access token has expired or has been reported as leaked or otherwise corrupted. The subsequent request may include a second protected version of the refresh token. The second protected version may be a second encrypted version of the refresh token. The refresh token can be encrypted with a new client identifier that is different from the first client identifier, where the new client identifier is used to generate the second protected version of the refresh token.

In some instances, the client application can maintain client identifiers as one key or public-private key pairs to encrypt and decrypt refresh tokens. In some instances, when the client application generated a new protected version of a refresh token based on a new identifier, the client application can update a key storage maintaining data including client identifiers to replace a previous version of the client identifier (or the client key pair) to support validation of a new protected version by the authorization server. In some instances, the second client identifier that was used by the authorization server to decrypt the first protected version of the refresh token can be updated by the client application. The second client identifier can be replaced with a third client identifier that can decrypt the second protected version of the refresh token. In some instances, the second and the third client identifier are persisted at a key store where a single version of a client identifier for the client application and/or for generating of protected versions of refresh tokens associated with a given user, application server, or else, is maintained. In some instances, at any point in time the key store may store only a single client identifier (or key pair) that is currently valid one that can be used for secure authorization of requests for generation of new access tokens.

In some instances, the key store may also include the stored first client identifier and other identifiers generated for the client application. The application server and/or the authorization server may be provided with access to the key store to perform validation of requests that can be encrypted with client identifiers. The key store may serve as a shared space for maintaining a single source of truth for a current client identifier that can be used to validly execute a process, such as token generation, access authorization, providing of a resource, among other examples of authorization scenarios between the client, the application, and the authorization server.

Figure 4:
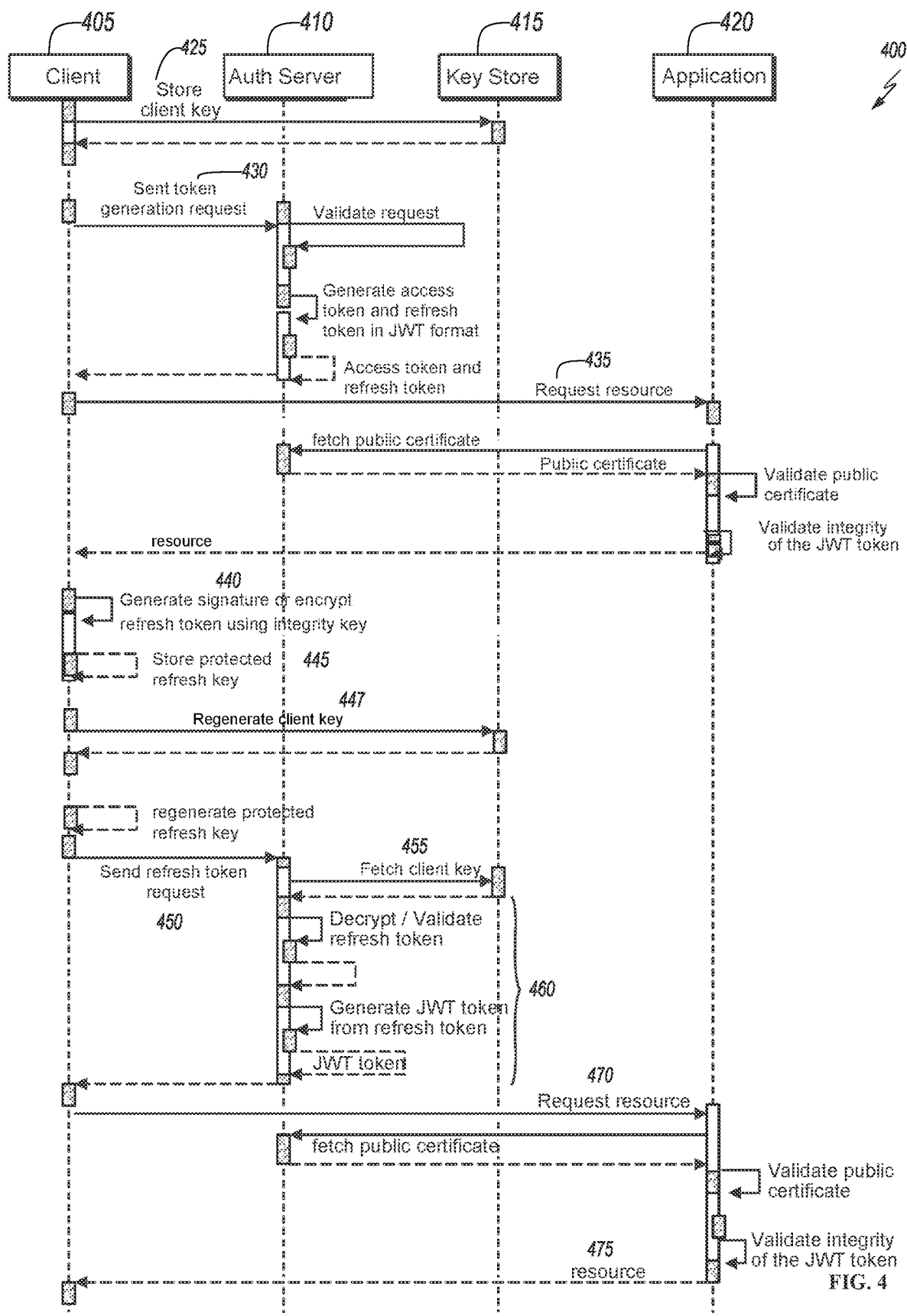
FIG. 4 is a flowchart for an example system for generating access tokens based on protected long-lasting refresh tokens in accordance with implementations of the present disclosure.

FIG. 4 is a flowchart for an example system 400 for generating access tokens based on protected long-lasting refresh tokens in accordance with implementations of the present disclosure.

In some instances, the system 400 includes a client 405, an authorization server 410, a key store 415, and an application 420. The client 405, the authorization server 410, and the application 420 may be similar to or different from the client application 115, the authorization server 125, and the application server 135 of FIG. 1, and/or the client 205, the authorization server 210, and the application 220 of FIG. 2. The system 400 may be an environment where method 300 may be executed.

At 425, the client 405 generates a client key as a client identifier that can be used to encrypt token issued for the client 405, storing the generated client key at a key store 415. For example, the key store 415 can be a security storage component storing the client identifier as discussed above in the description of FIG. 1, FIG. 2, and/or FIG. 3.

At 430, the client 405 requests, from the authorization server 410, generation of an access token to be used for authorization with the application 420, such as to receive or access resources from the application 420. The client 405 authenticates with the authorization server 410 when requesting generation of the access token. The authorization server 410 validates the request and generates an access token and a refresh token. In some examples, the generated access token and refresh token may be generated as described at 225 of FIG. 2, although any suitable generation method may be used. The generated access token and refresh token may be self-contained security tokens, for example, in a JWT format.

At 435, the client 405 request resources from the application 420 based on the access token provided by the authorization server. The application 420 fetches the public certificate of the authorization server 410 and validates the access token based on the public certificate. Further, the application 420 validates the integrity (e.g., scope of the authorization rights) of the token. In some instances, the application 420 can fetch the public certificate when the request 435 is received, prior to that, or in a scheduled iterative manner by regularly obtaining information about the public certificate from the authorization server 410. In response to successful validation of the request 435, a resource can be provided to the client 405.

In some instances, the access token generated for the client 405 may expire, such that regeneration of an access token may be required, and the generated refresh token by the authorization server may be used to authorize a request to generate a new access token. To provide a secure method for generating new access tokens based on long-lasting refresh tokens generated by the authorization server (for example, the access token generated based on the request 430), a protected version of the refresh token can be generated (at 440) by the client 405.

At 440, the generated protected version of the refresh key can be, for example, an encrypted version of the refresh key that is generated based on the client key stored at 425. The generated protected version of the refresh key includes a signature generated based on the contents of the refresh token and the client key, a combination thereof, or other form of encrypting of the client identifier into the protected version of the refresh token. For example, a decryption key may be acquired by the authorization server when receiving a request to generate a new access token based on a protected version of a refresh token based on an encryption key. The refresh token is issued by the authorization server 410 and the protected version of the refresh token is generated by the client application 405.

At 445, the client 405 stores the protected version of the refresh token at the client 405. In some instances, the protected version of the refresh token can be maintained remotely, and can be updated dynamically in response to a change to the current version of the client identifier associated with this protected version.

At 447, the client 405 requests regeneration of a client key. For example, the request may be performed after a notification of a leak or fraudulent use of the refresh token, the access key, the client key, or may be associated with a security break associated with the client 405, authorization server 410, or the key store 415. The regenerated protected refresh key may be stored again at the client 405, at a storage space defined by the client 405, or at another storage locations for storing confidential information.

At 450, the client 405 requests that the authorization server 410 generate a new access token, where the request includes a protected version of the refresh token. The protected version of the refresh token can be the latest generated and stored version of the protected refresh token by the client 405. The authorization server 410 processes the received request at 460, which may be similar to or different than some of the operations described for method 300 of FIG. 3. The authorization server 410 process the request 450 at the operations 460.

At 455, the authorization server 410 fetches a client key from the key store 415 to determine whether the authorization server 410 can decrypt the protected version of the refresh token to validate that the request is originating from an authorized party to send such a request for generation of a new access token. If the authorization server 410 is able to decrypt the protected version of the refresh token and validate the refresh token, the authorization server 410 can generate a new access token and provide it to the client 405.

At 470, the client requests resources from the application 420 by including the newly generated access token as credential to authorize access to the requested resources. The application 420 can validate the received request and the associated token by fetching the public certificate of the authorization server 410 to validate the access token provided with the request 470. The application 420 performs validation of the integrity of the access token. If the validation is successful, at 475, the application 420 sends the resource to the client. If the validation is not successful, the request is rejected.

Figure 5:
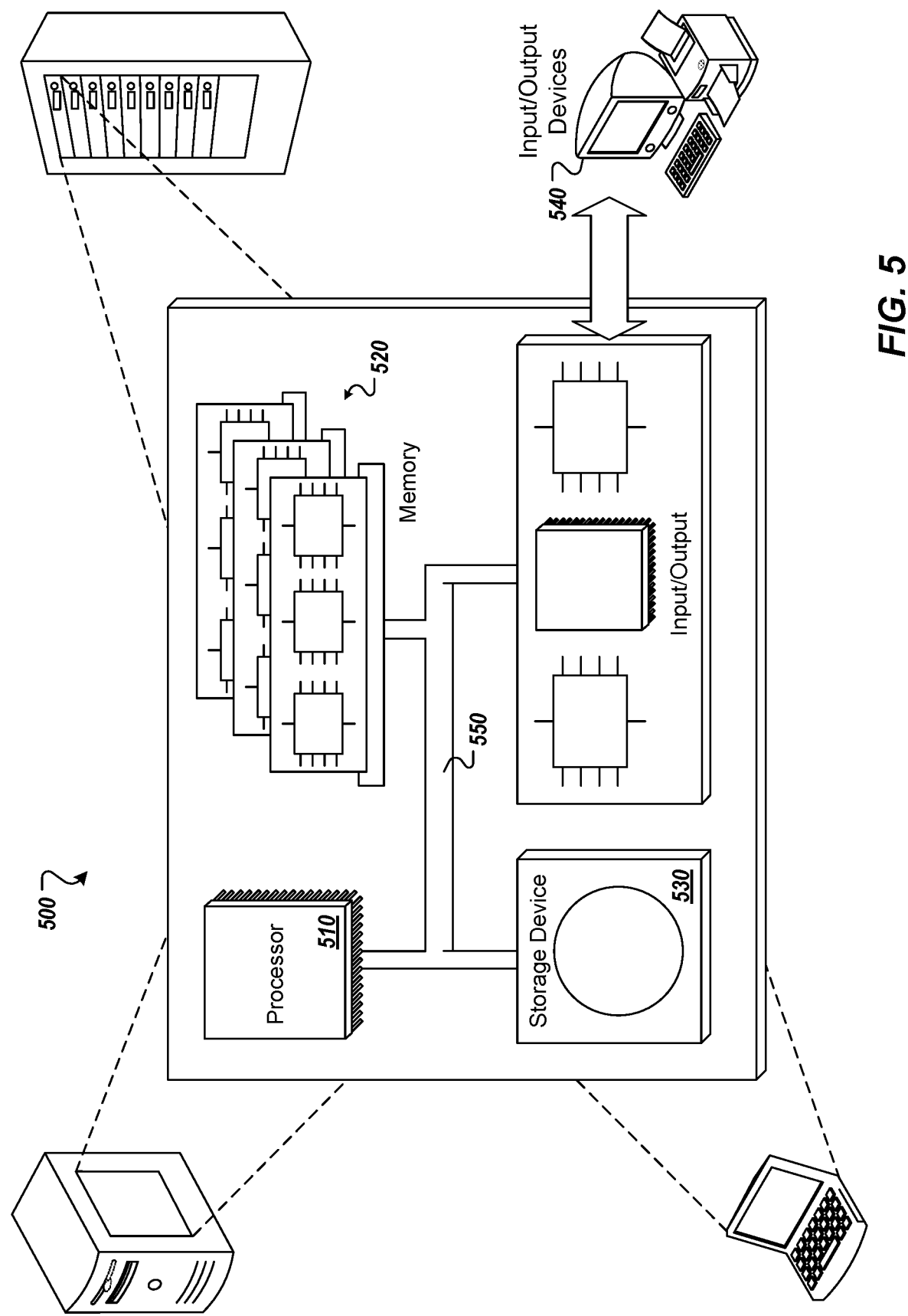
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 400. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system, including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a CRT (cathode ray tube) or LCD (liquid crystal display) monitor for displaying information to the user and a keyboard and a pointing device, such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method executed at an authorization server, the method comprising: receiving, from a client application, a first request to generate a new access token for authorization of the client application with an application server, wherein the first request includes a first protected version of a refresh token to authenticate with the authorization server for generating the new access token, wherein the first protected version of the refresh token is an encrypted version of the refresh token based on a first client identifier, and wherein the refresh token is a self-contained token that is readable by the authorization server; decrypting the first protected version of the refresh token to determine content of the refresh token, wherein the decrypting of the first protected version is based on a second client identifier of the client application that is externally invoked for validating the authorization; in response to successfully decrypting the first protected version of the refresh token, performing a validation of the refresh token to determine whether to authorize a generation of the new access token for the client application; and in response to successfully validating the refresh token: generating the new access token; and providing the new access token to the client application.

Example 2. The method of Example 1, wherein the first protected version of the refresh token is generated by the client application based on the first client identifier of the client application and the refresh token.

Example 3. The method of Examples 1 or 2, wherein the first client identifier and the second client identifier are identical.

Example 4. The method of Examples, 1, 2, or 3, further comprising obtaining, from a key management tool, the second client identifier of the client application as a current client identifier for decrypting protected refresh tokens received with requests for generation of access tokens.

Example 5. The method of Examples 1, 2, 3, or 4, wherein the first protected version of the refresh token is generated by encrypting the refresh token with the first client identifier, wherein the first protected version of the refresh token is decrypted based on the second client identifier, and wherein the first client identifier and the second client identifier are are symmetric keys generated for secure protection of exchanged information associated with the client application.

Example 6: The method of Examples 1, 2, 3, 4, or 5, wherein a signature is generated for the the refresh token based on the first client identifier and is sent together with the protected version of the refresh token to the authorization server.

Example 7. The method of Examples 1, 2, 3, 4, 5, or 6, wherein decrypting the first protected version of the refresh token comprises: validating the signature of the first protected version of the refresh token, wherein the signature is validated based on the second client identifier.

Example 8. The method of Examples 1, 2, 3, 4, 5, 6, or 7, wherein the first protected version of the refresh token that is received as part of the first request to generate the access token includes the refresh token and a message authentication code, wherein the message authentication code is computed based on at least a portion of the refresh token and the first client identifier.

Example 9. The method of Examples 1, 2, 3, 4, 5, 6, 7, or 8, wherein successfully decrypting the first protected version of the refresh token to determine the content of the refresh token further comprises: decrypting the first protected version of the refresh token based on the second client identifier of the client application; and in response to successfully decrypting the first protected version of the refresh token with the second client identifier, validating the refresh token as a valid token for requesting the new access token.

Example 10. The method of Examples 1, 2, 3, 4, 5, 6, 7, 8, or 9, wherein the refresh token is a string representing an authorization granted and is associated with a first validity period, wherein the new access token is associated with a second validity period, and wherein the first validity period is longer than the second validity period.

Example 11. The method of Examples 1, 2, 3, 4, 5, 6, 7, 8, 9, or 10, wherein the refresh token is generated by the authorization server, and wherein the refresh token is associated with the client application and the application server.

Example 12. The method of Examples 1, 2, 3, 4, 5, 6, 7, 8, 9, 10, 11, or 11, further comprising: receiving a subsequent request to generate a second new access token, wherein the subsequent request includes a second protected version of the refresh token, wherein the second protected version is a second encrypted version of the refresh token, wherein the refresh token is encrypted with a new client identifier different from the first client identifier to generate the second protected version of the refresh token; and replacing the second client identifier with a third client identifier that decryptes the second protected version of the refresh token, wherein the second and the third client identifier are persisted at a key store where a single version of a client identifier for the client application is maintained at any point in time.

Similar operations and processes as describes in Examples 1 to 12 may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 12 may also be contemplated.

What is claimed is:

1. A computer-implemented method, the method comprising:

regenerating and storing, by a client application, a new protected version of a refresh token based on a new version of a client key, wherein the new protected version of the refresh token is an encrypted version of the refresh token based on the new version of the client key, wherein the new version of the client key replaces a previous version of the client key persisted at a key store for the client application, wherein a single version of the client key is maintained at any point in time at the key store;

sending, by the client application and to an authorization server, a request to generate a new access token for authorization of the client application with an application server, wherein the request includes the new protected version of the refresh token to authenticate with the authorization server for generating the new access token for authorization of accessing resources at the application server; and receiving, by the client application and from the authorization server, the new access token, wherein the new access token is successfully validated at the authorization server based on decrypting the new access token using the new version of the client key.

2. The method of claim 1, comprising:
sending a request to generate the new version of the client key for the client application;
providing access to the key store for the application server and the authorization server to perform validation of requests requiring encryption with the client key.

3. The method of claim 1, wherein the refresh token is a self-contained token that is readable by the authorization server.

4. The method of claim 1, comprising:
obtaining, from a key management tool and at the authorization server, the new version of the client key as a current client identifier for decrypting protected refresh tokens in response to receiving requests for generation of access tokens.

5. The method of claim 1, comprising:
at the authorization server,
decrypting the new protected version of the refresh token to determine content of the refresh token, wherein the decrypting of the new protected version is based on a decryption client key of the client application that is externally invoked for validating the authorization;
in response to successfully decrypting the new protected version of the refresh token, performing the validating of the refresh token to determine whether to authorize a generation of the new access token for the client application.

6. The method of claim 4, wherein successfully decrypting the new protected version of the refresh token to determine the content of the refresh token comprises:
decrypting the new protected version of the refresh token based on the decryption client key of the client application; and
in response to successfully decrypting the new protected version of the refresh token with the decryption client key, validating the refresh token as a valid token for requesting the new access token.

7. The method of claim 4, wherein the new version of the client key and the decryption client key are symmetric keys generated for secure protection of exchange of information associated with the client application.

8. The method of claim 1, wherein the new protected version of the refresh token is decrypted based on the new version of the client key when obtained at the authorization server.

9. The method of claim 1, wherein sending the request to generate the new access token comprises:
generating a signature for the refresh token based on the new version of the client key; and
sending the new protected version of the refresh token together with the signature to the authorization server for performing validation at the authorization server.

10. The method of claim 9, comprising:
at the authorization server:
decrypting the new protected version of the refresh token by validating the signature of the new protected version of the refresh token, wherein the signature is validated based on a decryption client key associated with the client application.

11. The method of claim 1, wherein the refresh token is a string representing an authorization granted and is associated with a first validity period, wherein the new access token is associated with a second validity period, and wherein the first validity period is longer than the second validity period.

12. The method of claim 1, comprising:
sending, by the client application, a request to the application server to access a first resource, wherein the request includes an old access token generated by the authorization server for the client application prior the generation of the new access token; and
receiving a denial for accessing the first resource at the application server based on failure to validate the old access token.

13. A non-transitory, computer-readable medium coupled to one or more processors and having instructions stored thereon which, when executed by the one or more processors, cause the one or more processors to perform operations, the operations comprising:
regenerating and storing, by a client application, a new protected version of a refresh token based on a new version of a client key, wherein the new protected version of the refresh token is an encrypted version of the refresh token based on the new version of the client key, wherein the new version of the client key replaces a previous version of the client key persisted at a key store for the client application, wherein a single version of the client key is maintained at any point in time at the key store;
sending, by the client application and to an authorization server, a request to generate a new access token for authorization of the client application with an application server, wherein the request includes the new protected version of the refresh token to authenticate with the authorization server for generating the new access token for authorization of accessing resources at the application server; and
receiving, by the client application and from the authorization server, the new access token, wherein the new access token is successfully validated at the authorization server based on decrypting the new access token using the new version of the client key.

14. The computer-readable medium of claim 13, comprising instructions which when executed by the one or more processors, cause the one or more processors to perform operations comprising:
sending a request to generate the new version of the client key for the client application;
providing access to the key store for the application server and the authorization server to perform validation of requests requiring encryption with the client key.

15. The computer-readable medium of claim 13, wherein the refresh token is a self-contained token that is readable by the authorization server.

16. The computer-readable medium of claim 13, comprising instructions which when executed by the one or more processors, cause the one or more processors to perform operations comprising:
obtaining, from a key management tool and at the authorization server, the new version of the client key as a current client identifier for decrypting protected refresh tokens in response to receiving requests for generation of access tokens.

17. A system comprising
a computing device; and
a computer-readable storage device coupled to the computing device and having instructions stored thereon which, when executed by the computing device, cause the computing device to perform operations, the operations comprising:
regenerating and storing, by a client application, a new protected version of a refresh token based on a new version of a client key, wherein the new protected version of the refresh token is an encrypted version of the refresh token based on the new version of the client key, wherein the new version of the client key replaces a previous version of the client key persisted at a key store for the client application, wherein a single version of the client key is maintained at any point in time at the key store;
sending, by the client application and to an authorization server, a request to generate a new access token for authorization of the client application with an application server, wherein the request includes the new protected version of the refresh token to authenticate with the authorization server for generating the new access token for authorization of accessing resources at the application server; and
receiving, by the client application and from the authorization server, the new access token, wherein the new access token is successfully validated at the authorization server based on decrypting the new access token using the new version of the client key.

18. The system of claim 17, wherein the computer-readable storage device has instructions which when executed by the computing device, cause the computing device to perform operations comprising:
sending a request to generate the new version of the client key for the client application;
providing access to the key store for the application server and the authorization server to perform validation of requests requiring encryption with the client key.

19. The system of claim 17, wherein the refresh token is a self-contained token that is readable by the authorization server.

20. The system of claim 17, wherein the computer-readable storage device has instructions which when executed by the computing device, cause the computing device to perform operations comprising:
obtaining, from a key management tool and at the authorization server, the new version of the client key as a current client identifier for decrypting protected refresh tokens in response to receiving requests for generation of access tokens.

* * * * *